United States Patent [19]
Gold

[11] 3,821,049
[45] June 28, 1974

[54] METHOD FOR CONSTRUCTING A PHOTOGRAPHIC FILM ASSEMBLAGE

[75] Inventor: Nicholas Gold, Arlington, Mass.

[73] Assignee: Polaroid Corporation, Cambridge, Mass.

[22] Filed: Dec. 21, 1972

[21] Appl. No.: 317,541

Related U.S. Application Data

[62] Division of Ser. No. 163,212, July 16, 1971, Pat. No. 3,748,983.

[52] U.S. Cl................ 156/73, 53/29, 53/39, 156/303.1
[51] Int. Cl............................................. B32b 31/20
[58] Field of Search ............... 156/73, 303.1; 95/19; 53/26, 29, 39

[56] References Cited
UNITED STATES PATENTS

| | | | |
|---|---|---|---|
| 3,561,350 | 2/1971 | Dorney et al. | 156/73 X |
| 3,699,639 | 10/1972 | Ditto et al. | 156/73 X |

*Primary Examiner*—Edward G. Whitby

[57] ABSTRACT

An improved container for receiving and supporting photographic materials including a plurality of film units. An opening, defined by leading ends of a forward, rear, and a pair of side walls of the container, is provided for inserting the materials into the container. Thereafter a leading end wall is adapted to be ultrasonically bonded to the leading ends of the side and rear walls to partially close the opening and cooperate with the forward wall to define a withdrawal aperture through which the film units may be sequentially extracted from the container after exposure. The effective opening of the withdrawal aperture is controlled by a stop integrally formed with the leading end wall and adapted to be accurately spaced from an interior surface of the forward wall to insure that only one film unit at a time may be withdrawn from the container. Cooperating structure is provided at the interface between the rear wall and the leading end wall to insure accurate positioning of the stop with respect to the interior surface of the forward wall during an ultrasonic bonding cycle.

2 Claims, 7 Drawing Figures

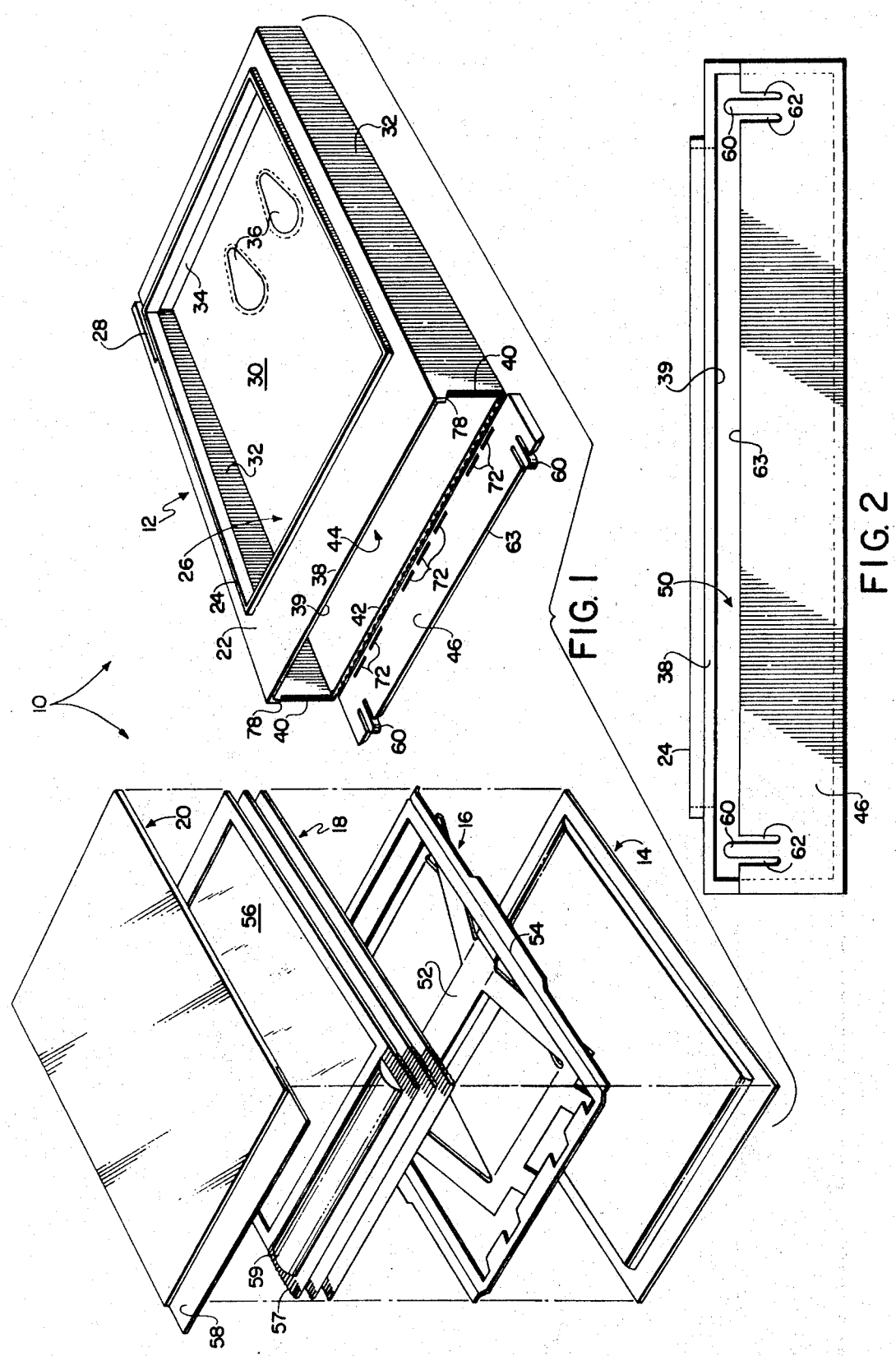

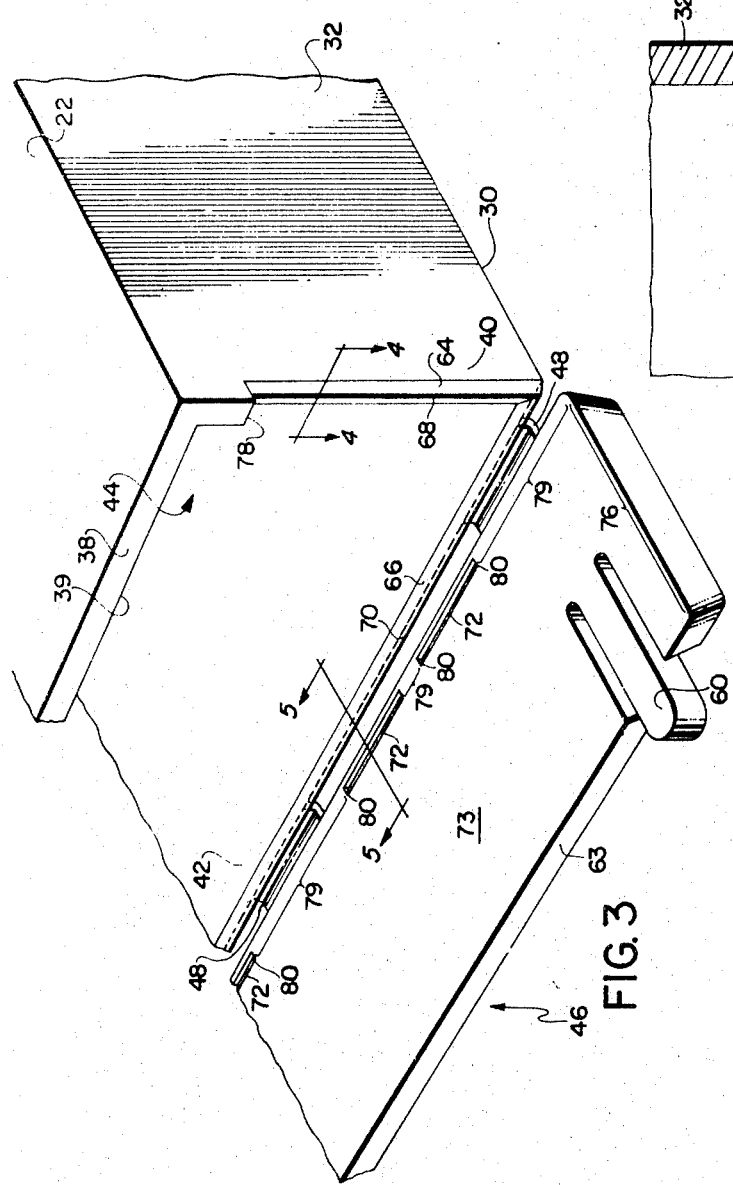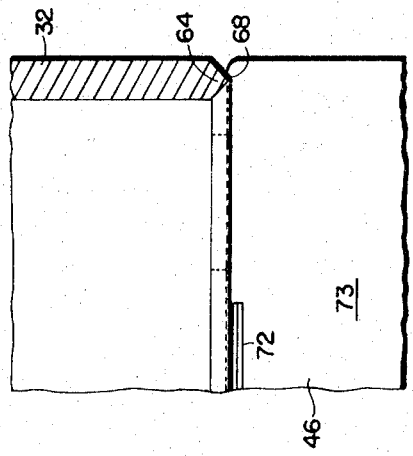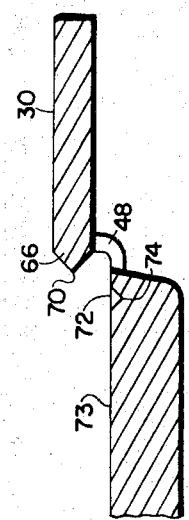
FIG. 3
FIG. 4
FIG. 5

METHOD FOR CONSTRUCTING A PHOTOGRAPHIC FILM ASSEMBLAGE

CROSS REFERENCE TO RELATED PATENT APPLICATIONS

This application is a division of our copending application, Ser. No. 163,212, filed July 16, 1971, now U.S. Pat. No. 3,748,983.

BACKGROUND OF THE INVENTION

1. Field of the Invention

This invention relates to the field of containers for receiving and supporting photographic materials including a plurality of film units.

2. Description of the Prior Art

The present invention is concerned with improvements in containers of the type which are adapted to be preloaded with photographic materials to form film packs suitable for use with photographic cameras. Such containers are designed to house a plurality of individual film units arranged in stacked relation, a support member for spring biasing the stack of film units toward an exposure position within the container, and a removable dark slide for preventing exposure of the film units prior to insertion of the film pack into the camera. A battery may also be included in the container for powering electrical components within the camera.

Structurally, these containers include a forward wall, having a light-transmission section therein, a rear wall, spaced from the forward wall by a pair of side walls and a trailing end wall, thus forming a main container body, and a leading end wall. The leading ends of the forward, side, and rear walls cooperate with each other to define a generally rectangular opening at the leading end of the container through which the photographic materials may be inserted. Thereafter, the leading end wall of the container is adapted to be ultrasonically welded to the leading ends of the side and rear walls such that it partially closes the opening and cooperates with the leading end of the forward wall to define an elongated withdrawal aperture.

To insure that only one film unit at a time may be extracted from the container, i.e., the forwardmost film unit located at the exposure position adjacent the light-transmission section in the forward wall, it is desirable to control the effective opening of the withdrawal aperture in terms of its dimensions and location relative to the forwardmost film unit. This control is accomplished by means of a stop which is integrally formed with the leading end wall and is adapted to be accurately spaced from an interior surface of the leading end of the forward wall. By accurately controlling the spacing between the stop and the forward wall, the effective opening of the withdrawal aperture may be dimensioned to allow the forwardmost film unit to be advanced easily through the withdrawal aperture while preventing the next underlying film unit from being extracted along with the forwardmost film unit.

Once the film pack is located in the camera, the dark slide is removable through the withdrawal aperture to uncover the forwardmost film unit. Subsequent to exposure, through the light-transmission section in the forward wall, the forwardmost film unit may be extracted from the container through the withdrawal aperture, in the same manner as the dark slide.

The containers are formed of an opaque, thermoplastic material and are intended to be compatible with high speed automated production equipment which is adapted to load the materials into the container, position the leading end wall over the opening, and effect the seal. Ultrasonic welding has been found to be the preferred method for joining the leading end wall to the main body of the container because it is faster than solvent or adhesive bonding, or conventional heat sealing. Of particular interest is the fact that the ultrasonic heating of the parts to be joined may be restricted to an area adjacent to the surfaces to be bonded without heating the entire container which may result in distortion of the container walls.

This selective heating of the parts is accomplished by the use of energy concentrating structure. As is well known in the art of ultrasonically welding thermoplastic materials, ultrasonic energy may be concentrated by reducing the cross section of the parts in the area to be heated. Such energy concentrating structure is incorporated into the design of the containers in the form of triangular tapered sections at the leading ends of the side and rear walls. The leading edges of these tapered sections are adapted to be placed in abutment, or frictional contact, with the interior surface of the leading end wall at the initiation of an ultrasonic bonding cycle. Ultrasonic energy is then applied to the main container body, or to the leading end wall, causing the abutting surfaces to vibrate relative to one another. The heat of friction generated at the interface between the leading edges of the tapered sections and the interior surface of the leading end wall causes the tapered sections to deform, or melt, thereby effecting the bond.

The leading ends of the side and rear walls have a nominal thickness of 25 mils. Therefore, the quality of the bond is quite important. It must be strong enough to withstand a force transmitted to the bonded interface which is caused by a film unit frictionally engaging the stop associated with the leading end wall as the film unit is extracted from the container. The bond also must be lighttight to prevent fogging of the film units within the container.

Experience has shown that it is particularly important to maintain the alignment of the leading end wall with respect to the forward wall of the container during the ultrasonic bonding process to insure that the stop will be accurately spaced from the interior surface of the forward wall. In practice, maintaining proper alignment is particularly difficult since the energy concentrating tapered sections melt quickly during the initial segment of the bonding cycle and the main container body and the leading end wall are axially loaded toward one another during the bonding cycle to maintain contact between the two parts. This results in movement of the leading end wall toward the leading ends of the side and rear walls. While providing for axial movement of the parts during the bonding cycle, the parts also must be restrained to prevent relative movement in a direction parallel to the plane of bond because the melting plastic at the interface acts as a lubricant and the vibratory effect of the ultrasonic energy causes the leading end wall to move or float on the melted plastic.

One standard method for properly aligning the parts to be bonded is to employ complex holding jigs and fixtures. Not only is this method expensive, but more importantly, it is excessively time consuming and tends to limit the production rate of the high speed production equipment. Therefore, it is desirable that some structure be added to the container which does not significantly add to its cost and provides means for aligning the leading end wall with respect to the forward wall during the bonding process without resorting to the use of holding jigs and fixtures. Another standard technique for accurate alignment is to provide integrally formed means for mechanically interlocking the two parts prior to initiating the bonding cycle in addition to the energy-concentrating structure. This approach is not feasible because of the limited areas of contact between the leading end wall and the thin leading ends of the side and rear wall which also serve as the energy-concentrating structure.

SUMMARY OF THE INVENTION

The present invention is concerned with improvements in containers of the type described and, more specifically, relates to novel, integrally formed container structure, i.e., energy concentrating means and positioning means, adapted to cooperate with one another for accurately positioning the leading end wall and integrally formed stop means with respect to the forward wall of the container during an ultrasonic bonding cycle. This improvement eliminates the need for costly and time consuming holding jigs and fixtures thereby making the novel container especially well suited for use with automated high speed production equipment.

The energy concentrating means take the form of integrally formed tapered sections disposed at the leading ends of the container's side and rear walls. The tapered sections are configured to reduce in cross section to an apex forming leading edges of the side and rear walls surrounding the opening, through which the photographic materials are adapted to be inserted, on three sides. These leading edges are adapted to be placed in abutment with the interior surface of the leading end wall at the initiation of a bonding cycle to establish paths for ultrasonic energy transmission across the interface between the leading end wall and the main container body.

The cooperating positioning means take the form of series of recesses or elongated indentations integrally formed in the interior surface of the leading end wall and spaced from one another in end-to-end alignment adjacent the bottom edge thereof. The elongated indentations are configured to have a tapered cross section, conforming to that of the tapered section at the leading end of the rear wall, and are disposed such that the center line of the indentations is in alignment with the leading edge of the rear wall when the leading end wall is positioned in face-to-face closing relation and abutment with the leading edges of the side and rear walls. In this position, portions of the leading edge of the rear wall make contact with the interior surface of the leading end wall adjacent lateral ends of the elongated indentations. This establishes a series of paths for ultrasonic energy transmission around, but not through the elongated indentations.

Upon the application of ultrasonic energy, the energy concentrating tapered section at the leading end of the rear wall deforms selectively where it is in contact with the interior surface of the leading end wall. Since ultrasonic energy does not flow through those portions of the tapered section positioned opposite the elongated indentations, they do not melt but rather extend into the indentations as the leading end wall of the container moves toward the side and rear walls under the influence of the axial loading. The conforming shape of the indentations and the unmelted portions of the tapered section cause them to mechanically interlock thereby restraining movement of the leading end wall in a direction parallel to the plane of the bond being formed resulting in accurate spacing of the stop means with respect to the forward wall. After the bond has been formed, the interlocked portions of the energy concentrating tapered section cooperate with the elongated indentations to form a light seal thereby insuring that the interface between the leading end wall and the rear wall of the container is in a lighttight condition. The container is also provided with integrally formed locating means in the form of locating surfaces adapted to overlie an upper edge of the leading end wall to position it relative to the forward wall of the container prior to the initiation of the ultrasonic bonding cycle.

Therefore, it is an object of the present invention to provide a container for receiving and supporting photographic materials including a plurality of film units, the container includes a forward wall, a leading end wall adapted to be ultrasonically bonded to a portion of the container in position to cooperate with the forward wall to define a withdrawal aperture for a film unit, stop means adapted to be accurately spaced from the forward wall to prevent more than one film unit at a time passing through the withdrawal aperture, energy concentrating means, and positioning means, selectively engageable with portions of the energy concentrating means for positioning the leading end wall to accurately space the stop means from the forward wall during an ultrasonic bonding cycle.

It is a further object of the present invention to provide a novel film assemblage comprising a container of the aforementioned type in combination with photographic materials including a plurality of film units arranged in stacked relation with the container.

It is yet another object of the present invention to provide a method for bonding a leading end wall to a portion of a thermoplastic container to accurately position a stop, integrally formed with the leading end wall, with respect to a forward wall of the container.

Other objects of the invention will, in part, be obvious and will, in part, appear hereinafter.

The invention accordingly comprises a product possessing the features, properties and the relation of components which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is a perspective view of the container embodying the instant invention and the photographic materials to be placed therein shown in exploded fashion;

FIG. 2 is an enlarged elevational view of the leading end of the closed container embodying the instant invention;

FIG. 3 is an enlarged fragmentary, perspective view of the leading end of the container shown in FIG. 1;

FIG. 4 is a fragmentary, elevational view, partly in section, of the side and leading end walls of the container taken along lines 4—4 of FIG. 3;

FIG. 5 is a fragmentary, elevational view, partly in section, of the rear and leading end walls of the container taken along lines 5—5 of FIG. 3.

DESCRIPTION OF THE PREFERRED EMBODIMENT

Figure 6:
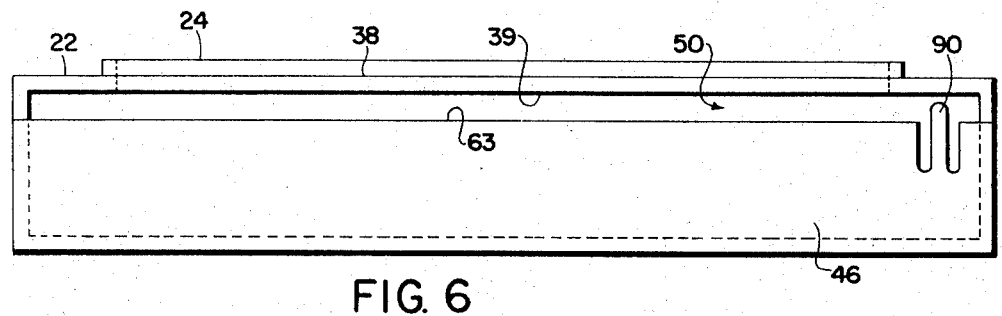
FIGS. 6 and 7 illustrate alternate configurations of the leading end wall.

Referring now to FIG. 1 of the drawings, the components making up a film assemblage or film pack of the type adapted to be inserted into a self-developing camera are shown generally at 10. These components include a film container 12, shown in an open position for receiving a stack of photographic materials which include an electrical battery 14, a support member 16, a plurality of film units 18, and a dark slide 20.

Film container 12 is formed of a light opaque, thermoplastic material and includes a forward wall 22 having an integrally formed upstanding rib 24 which defines the bounds of a generally rectangular light-transmitting section or exposure aperture 26 through which actinic radiation is adapted to pass to expose the forwardmost film unit 18. Upstanding rib 24 is adapted to fit, in telescoping fashion, inside a rectangular aperture within the camera to accurately locate the forwardmost film unit 18 and an exposure plane and to position an elongated aperture 28, located near the trailing end of forward wall 22, in alignment with a film advancing mechanism also located within the camera. A rear wall 30, spaced from forward wall 22 by a pair of side walls 32 and a trailing end wall 34, has a pair of tear-drop shaped openings 36 therein through which electrical contacts mounted in the camera are adapted to extend to make contact to electrodes (not shown) on the underside battery 14. Leading ends 38, 40, and 42, of forward wall 22, side walls 32, and rear wall 30, respectively, cooperate to form a generally rectangular opening 44, at the leading end of container 12, through which the photographic materials are adapted to be inserted. Thereafter, a leading end wall 46, which is attached to the leading end 42 of rear wall 30 by integrally formed flexible hinges 48 (see FIGS. 3 & 5) is rotated 90° into an abutting position with the leading ends 40 of side walls 32 and the leading end 42 of rear wall 30 and is ultrasonically welded thereto to partially close opening 44. As best shown in FIG. 2, once leading end wall 46 is welded in place, it cooperates with leading end 38 of forward wall 22 to define a generally elongated, rectangular, withdrawal aperture 50 through which the dark slide 20 and the film units 18 may be sequentially extracted from container 12.

The photographic materials are arranged in stacked relation within film container 12 in the order shown in FIG. 1. The battery 14 is positioned adjacent rear wall 30 with its electrodes in alignment with openings 36. Support member 16 rests atop battery 14 and includes a generally H-shaped spring portion 52 coupled to a rectangular frame 54 which is dimensioned to engage the outer peripheral edges of the rearwardmost film unit 18 to spring load the film units toward forward wall 22. Film units 18 are arranged in stacked relation with their photosensitive area facing exposure aperture 26 such that forwardmost film unit 18, upon withdrawal of dark slide 20, is pressed against the interior surface of forward wall 22 and is automatically positioned at an exposure plane within the camera. Dark slide 20 is positioned over the forwardmost film unit 18 and is dimensioned to cover apertures 26 and 28. An opaque flexible skirt 58 is provided at the leading end of dark slide 20 and is adapted to be folded down over the leading ends of film units 18 thus covering withdrawal aperture 50. Dark slide 20 serves to prevent exposure of film units 18 prior to insertion of the film container in the camera and is removable through withdrawal aperture 50 after insertion.

Film units 18 contain all of the materials necessary for producing a positive photographic print and generally include a photosensitive element, a superposed transparent image-receiving element 56, and a pod 59, at the leading end of film unit 18, containing processing fluid which is adapted to be spread between and in contact with the photosensitive element and image-receiving element, subsequent to exposure, to initiate a diffusion transfer process, as is well known in the photographic art. Details as to the construction of film units 18 may be found in U.S. Pat. No. 3,415,644, granted on Dec. 10, 1968, to E. H. Land and assigned to the same assignee as the instant invention.

In use, the loaded container 12 is inserted into an appropriate camera such that exposure aperture 26 is aligned with the exposure plane of the camera, aperture 28, in forward wall 22 of the container, is aligned with a film advancing mechanism, and withdrawal aperture 50 is positioned in alignment with the bite or nip of a pair of pressure-applying rollers within the camera. The film advancing mechanism may take the form of an arm or pick adapted to extend through aperture 28 and engage the trailing end of dark slide 20. The arm is reciprocally driven and advances the dark slide 20, leading end first, through withdrawal aperture 50 and into the bite of the processing rollers which are driven in a direction to advance the dark slide 20 therebetween to the exterior of the camera. Once dark slide 20 is removed, the forwardmost film unit 18 is located at the exposure plane within the camera and is adapted to be exposed through exposure aperture 26 and subsequently advanced by the advancing mechanism, in the same manner as the dark slide 20, through aperture 50 into the bite of the rotating rollers. The rollers are configured to apply compressive pressure to the film unit which causes pod 59 to rupture thereby dispensing the processing fluid between and in contact with the photosensitive and image-receiving elements as the film unit is advanced to the exterior of the camera. Details of the construction of a camera adapted to utilize a photographic film assemblage of the type described herein may be found in the co-pending U.S. Pat. Application of Igor Blinow et al., Ser. No. 141,553, filed on May 10, 1971, now U.S. Pat. No. 3,709,122 and assigned to the same assignee as the instant application.

To insure that only one film unit at a time may be advanced through withdrawal aperture 50, i.e., the forwardmost film unit 18 located in the exposure position adjacent exposure aperture 26 in forward wall 22 of the container, leading end wall 46 is provided with an integrally formed stop in the form of a pair of fingers 60. These fingers 60 extend part-way across withdrawal aperture 50 and limit the effective opening to a space between the top of fingers 60 and the interior surface 39 of the forward wall 22. In the embodiment shown in FIG. 2 the fingers 60 are positioned to limit the effective opening of withdrawal aperture 50 near the lateral margins 57 of a film unit positioned against the interior surface of forward wall 22. To reduce the manufacturing tolerances of the fingers 60 and the flatness of the interior surface 39 of forward wall 22, it has been found helpful to make fingers 60 somewhat resilient such that they bend outwardly in response to engagement therewith by a film unit as the film unit is advanced through the withdrawal aperture 50. This resiliency may be provided by deep slots 62 in the leading end wall 46 adjacent fingers 60 as best seen in FIG. 2. It will be noted that the upper edge 63 of leading end wall 42 is spaced further from the interior surface 39 of forward wall 22 than the top of resilient fingers 60 to permit the passage of the thick processing fluid pod 59 located between the lateral margins 57 of the film unit 18.

Figure 7:
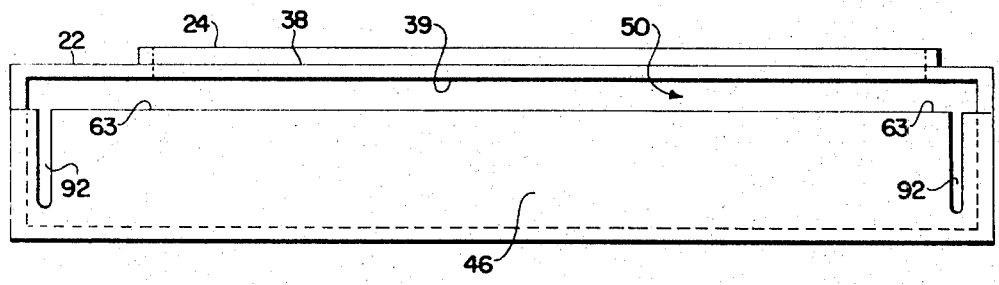

In another design, (see FIG. 6), the stop may take the form of a single resilient finger 90 which extends part of the way across withdrawal aperture 50 to limit the effective opening of the withdrawal aperture at least near one lateral margin 57 of a film unit 18 positioned against an interior surface 39 of forward wall 22. In FIG. 7, the resilient stop takes the form of the upper edge 63 of leading end wall 46. Again deep slots 92 are provided near lateral ends of leading end wall 46 to make upper edge 63 slightly resilient. The stop limits the effective opening of the withdrawal aperture 50 in an area between lateral margins 57 of film unit 18. It will be noted that in this design the effective opening of withdrawal aperture 50, i.e., the space between upper edge 63 of leading end wall 46 and interior surface 39 of forward wall 22 of the container is larger than the effective openings provided in the last two mentioned configurations. This is because the stop provides discrimination between the forwardmost film unit 18 and the next underlying film unit in the area between the lateral margins and thus sufficient spacing must be provided to accommodate the fluid containing pod 59 at the leading end of the film unit. The stops shown in FIGS. 2 and 6 discriminate between adjacent film units near the thinner lateral margins 57 of the film units. Further details as to the construction of leading end wall 46 and the cooperation between the integrally formed stop and forward wall 22 may be found in the co-pending U.S. Pat. Application of Nicholas Gold, Ser. No. 784,160, filed on Dec. 16, 1968, now U.S. Pat. No. 3,607,283, and assigned to the same assignee as the instant invention.

As noted earlier, after the photographic materials have been loaded into container 12, leading end wall 46 is adapted to be rotated 90° to a position partially closing opening 44 in which it cooperates with the leading end 38 of forward wall 22 to define the elongated withdrawal aperture 50. Once leading end wall 46 is located in this position, it is adapted to be ultrasonically welded to the leading ends 40 and 42 of the side walls 32 and rear wall 30, respectively. In order to localize the heating and melting during the ultrasonic bonding cycle, the side walls 32 and the rear wall 30 are provided with energy concentrating means or energy directors at their leading ends 40 and 42. Referring to FIGS. 3, 4, and 5, it will be seen that these energy directors take the form of integrally formed V-shaped tapered sections 64, at the leading ends of side walls 32 and 66 at the leading end of rear wall 30. Sections 64 and 66 are tapered to reduce in cross section to an apex at a leading edge 68 of side walls 32 and leading edge 70 of rear wall 30.

As best seen in FIGS. 3 and 5, a series of elongated, linear, V-shaped recesses or indentations 72 are provided in the interior surface 73 of leading end wall 46 which are adapted to cooperate with tapered section 66 on rear wall 30 for accurately positioning the leading end wall 46 and the stops 60 with respect to forward wall 22 during the ultrasonic bonding cycle. As best seen in FIG. 5, the indentations 72 are configured to conform in cross section to the tapered section 66. The indentations 72 are spaced and disposed in linear end-to-end relation adjacent the bottom edge of leading end wall 46 such that a centerline 74 of the indentations 72 is in alignment with the leading edge 70 of rear wall 30 when the leading end wall 46 is moved to its closed position.

To initially locate the leading end wall 46 with respect to forward wall 22, prior to the initiation of the ultrasonic bonding cycle, tapered sections 64 on side walls 32 are set back from the leading edge 38 of forward wall 22 such that the uppermost portions of side walls 32 provide locating surfaces 78 which are adapted to overlie the upper edge 63 of leading end wall 46 thereby limiting vertical movement of the leading end wall 46 toward the forward wall 22.

In the proper bonding position, side wall leading edges 68 abut, or are in frictional contact with, the interior surface 73 of leading end wall 46 adjacent its lateral edges in areas designated as 76. The rear wall leading edge 70, being in alignment with the center-line 74 of indentations 72, contacts surface 73, selectively, in areas designated as 79 adjacent lateral ends 80 of indentations 72. At the initiation of the ultrasonic bonding cycle, leading end wall 46 is axially loaded toward the leading edges of side walls 32 and rear wall 30 and ultrasonic energy is applied either to the main container body or the leading end wall 46. This energy causes vibratory motion between leading edges 68 and 70 and the contacted areas 76 and 79 of interior surface 73 thereby generating heat which causes tapered sections 64 and the portions of tapered section 66 in contact with surface areas 79 to melt. As these tapered sections begin to melt, the leading end wall 46 moves toward side walls 32 and rear wall 30 under the influence of the axial loading and those portions of the rear wall tapered section 66 located opposite indentations 72, which are not in contact with areas 79 of surface 73 and therefore do not melt, extend into and engage the interior surfaces of the indentations 72. The conforming shape of tapered section 66 and indentations 72 causes rear wall 30 and leading end wall 46 to mechanically interlock thereby preventing both horizontal and vertical motion of leading end wall 46 relative to side walls 32, rear wall 30 and forward wall 22 to insure proper positioning during the bonding cycle.

At the completion of the ultrasonic bonding cycle, the leading end wall 46 has been sealed to the leading ends 40 of side walls 32 and to portions of the leading end 42 of rear wall 30. The portions of tapered section 66 which extend into indentations 72 have not been ultrasonically sealed to the interior surfaces of indentations 72 but rather remain mechanically interlocked therewith. While thermo-fusion has not taken place in the indentations 72, the conforming shape of the indentation 72 and tapered section 66 do form an effective light seal or labyrinth such that the interface between leading end wall 46 and rear wall 30 is lighttight.

It will be apparent to one skilled in the art that while the energy concentrating means or tapered sections 64 and 66 were shown to be located on side walls 32 and rear wall 30 that it would be obvious to form the tapered sections on the interior surface of leading end wall 46 and provide recesses or indentations 72 at the leading edge of rear wall 30. Likewise the invention may be practiced by locating recesses 72 such that they are in alignment with the leading edges of side walls 32 rather than in alignment with rear wall 30. Also, it is thought to be obvious that the number of recessed portions 72 may be varied and in some cases may only include one recessed portion 72.

From the foregoing it can be seen that there has been disclosed a container for receiving and supporting photographic materials having unique structure in the form of energy concentrating means and positioning means adapted to cooperate such that the leading end wall of the container and stop means integrally formed therewith is self-aligning with respect to the forward wall of the container during an ultrasonic bonding cycle and that such a structure is compatible and economical for use with high speed, automated production equipment since the self-aligning structure of the container eliminates the need for supplementary holding jigs and fixtures.

Since certain changes may be made in the above product without departing from the scope of the invention herein involved, it is intended that all matter contained in the above description or shown in the accompanying drawings shall be interpreted as being illustrative and not in a limiting sense.

What is claimed is:

1. A method of bonding a leading end wall to a portion of a thermoplastic container having a plurality of film units therein to accurately position a stop integrally formed with said leading end wall with respect to a forward wall of said container, said method comprising the steps of:

forming said container to include a plurality of energy concentrating tapered sections on said portion of said container and positioning indentations in an interior surface of said leading end wall;

loading said film units into said container;

placing said interior surface of said leading end wall in abutment with said tapered sections such that at least one of said tapered sections contacts said interior surface adjacent lateral ends of said indentations;

axially loading said leading end wall and said portion of said container toward each other; and applying ultrasonic energy to at least one of said portions of said container and said leading end wall to cause portions of said tapered sections in contact with said interior surface to deform to effect the bond, said axially loading causing said leading end wall and said portion of said container to move toward each other as said tapered sections deform, thereby resulting in portions of said one tapered section in alignment with said indentations to extend into and mechanically interlock therewith for limiting movement of said leading end wall with respect to said forward wall to accurately position said stop in relation therewith.

2. The method of claim 1 wherein said one tapered section and said indentations are formed to have conforming shapes in cross section and said portions of said one tapered section cooperate with said indentation when mechanically interlocked to form a labyrinth light seal.

* * * * *